(12) United States Patent
Agam et al.

(10) Patent No.: US 7,715,276 B2
(45) Date of Patent: May 11, 2010

(54) PRESENCE DETECTION SYSTEM FOR PATH CROSSING

(75) Inventors: Uri Agam, Montréal (CA); Eli Gal, Montréal (CA); Pino Marcovecchio, Montréal (CA)

(73) Assignee: Sensotech Inc., Montreal (CA)

( * ) Notice: Subject to any disclaimer, the term of this patent is extended or adjusted under 35 U.S.C. 154(b) by 235 days.

(21) Appl. No.: 11/745,481

(22) Filed: May 8, 2007

(65) Prior Publication Data
US 2007/0274158 A1 Nov. 29, 2007

Related U.S. Application Data

(60) Provisional application No. 60/746,791, filed on May 9, 2006.

(51) Int. Cl.
*G01S 15/93* (2006.01)
(52) U.S. Cl. .......................................................... 367/96
(58) Field of Classification Search .................. 367/96, 367/93, 151; 340/944, 908.1, 925, 917
See application file for complete search history.

(56) References Cited

U.S. PATENT DOCUMENTS

| | | | | |
|---|---|---|---|---|
| 3,087,140 | A | * 4/1963 | O'Neill | ........................ 367/93 |
| 4,884,448 | A | 12/1989 | Ogawa et al. | |
| 5,569,888 | A | * 10/1996 | Kamani et al. | .............. 187/317 |
| 5,625,340 | A | 4/1997 | Gustavsson | |
| 5,680,313 | A | 10/1997 | Whittaker et al. | |
| 5,774,045 | A | 6/1998 | Helma et al. | |
| 5,864,304 | A | 1/1999 | Gerszberg et al. | |
| 5,890,682 | A | 4/1999 | Welk | |
| 5,910,929 | A | 6/1999 | McConnell et al. | |
| 5,954,299 | A | 9/1999 | Pace | |
| 6,195,020 | B1 | 2/2001 | Brodeur, Sr. et al. | |
| 6,340,139 | B1 | 1/2002 | Hilleary | |

(Continued)

FOREIGN PATENT DOCUMENTS

JP 05270407 A * 10/1993

(Continued)

OTHER PUBLICATIONS

International Search Report mailed Aug. 7, 2007 issued in Application No. PCT/CA2007/000795.

*Primary Examiner*—Dan Pihulic
(74) *Attorney, Agent, or Firm*—Agence de Brevets Fournier

(57) ABSTRACT

A presence detection system for level crossing or to detect a target at the intersection of any paths is described herein. The system comprises an ultrasound sensor array positioned at the intersection of the first and second paths for defining a detecting area thereon and for emitting a first trigger signal when the body is in the detecting area; and a controller coupled to the ultrasound sensor array for receiving the first trigger signal and for emitting an alarm signal indicative of the first trigger signal. The sensor array detects the presence of a target by creating acoustic virtual lines which form between emitter and receiver or transducer and reflectors and/or by deploying conical or parallel detecting beams and which can be used, for example to measure the distance between each sensor forming the array and the target. The sensor array can deploy beams or acoustic lines in several plans and therefore allow detecting penetration above the conventional railway crossing barriers.

43 Claims, 16 Drawing Sheets

U.S. PATENT DOCUMENTS

| | | |
|---|---|---|
| 6,384,742 B1 * | 5/2002 | Harrison .................... 340/944 |
| 6,400,311 B1 | 6/2002 | Kolbi et al. |
| 6,466,157 B1 | 10/2002 | Bjornholt et al. |
| 6,614,536 B1 | 9/2003 | Doemens et al. |
| 6,614,719 B1 | 9/2003 | Grzesek |
| 6,750,444 B2 | 6/2004 | Rendahl et al. |
| 6,909,668 B2 | 6/2005 | Baldwin et al. |
| 6,933,858 B2 | 8/2005 | Pieralli |
| 6,987,707 B2 | 1/2006 | Feintuch et al. |
| 2007/0274158 A1 * | 11/2007 | Agam et al. .................. 367/96 |

FOREIGN PATENT DOCUMENTS

| | | |
|---|---|---|
| JP | 11227608 A * | 8/1999 |
| WO | 99/05525 | 3/1994 |
| WO | WO 2007134430 A1 * | 11/2007 |

* cited by examiner

FIG_2

FIG_4

FIG_5

FIG_8

FIG_9

PRESENCE DETECTION SYSTEM FOR PATH CROSSING

FIELD

The present invention relates to detection system using ultrasound.

More specifically, the present invention relates to a presence detection system for path crossing such as level crossing.

BACKGROUND

Security at level crossings has been an issue since the first trains have set wheels on the face of the earth. In addition to warning lights and audio signals, one of the first, and to this day, still widely and almost uniquely used solution, is to provide pivotable barriers on both sides of the railway track. As it is believed to be well known, such barriers are automatically lowered before the passage of a train to block the path on both sides and then raised after the train is passed.

Even though this gate system has been found effective to visually alert travellers of the incoming passage of a train at a level crossing, it does not alert of the presence of a vehicle already positioned on the railway before the lowering of the gates or of a smaller vehicle or a pedestrian that could have decided to ignore the gates and accompanying visual and sound alarm signals and still cross the track.

A presence detection system for level crossing and more generally to path crossing allowing additional functionalities and flexibilities than such a system is therefore desirable.

DETAILED DESCRIPTION

In accordance with a first aspect of the present invention, there is provided a system for detecting the presence of a body at the intersection between first and second paths, the system comprising:

an ultrasound sensor array for defining a detecting zone at the intersection of the first and second paths and for emitting a first trigger signal when the body is in the detecting zone; and a controller coupled to the ultrasound sensor array for receiving the first trigger signal and for emitting an alarm signal indicative of the first trigger signal.

The sensor array may create acoustic virtual lines which form between emitter and receiver or transducer and reflectors. The sensor is configured so as to provide lines having width allowing to filter out target under certain size.

The sensor array may also deploy conical or parallel detecting beams which can be used, for example to measure the distance between each sensor forming the array and the target.

According to specific embodiments, the conical or parallel beams or acoustic lines are deployed in several plans and therefore allow detecting penetration above the conventional railway crossing barriers.

The system can eliminate false signals by measuring the target size and speed.

The system can be used for detecting a target, such as a vehicle, at a level crossing.

Once a target/vehicle is detected the system triggers an alarm signal which is sent and displayed by display signs along the track or sent to an incoming train or to any other monitoring centers, via wireless or any other communication means.

According to a second aspect of the present invention, there is provided sensor array for detecting the exceeding of a transversal position by a body along a path:

an ultrasound sensor assembly for creating an acoustic line over the path at the level of the transversal position along the path and for emitting a first signal when the acoustic line is cut.

It is to be noted that the expression "body" is to be construed herein broadly so as to include any animate or inanimate object, any living entity including a person, an animal or plant, a projectile, etc, that can obstruct a first path and come into collision with a vehicle or another body moving along a second path.

Other objects, advantages and features of the present invention will become more apparent upon reading the following non restrictive description of illustrated embodiments thereof, given by way of example only with reference to the accompanying drawings.

Figure 1:
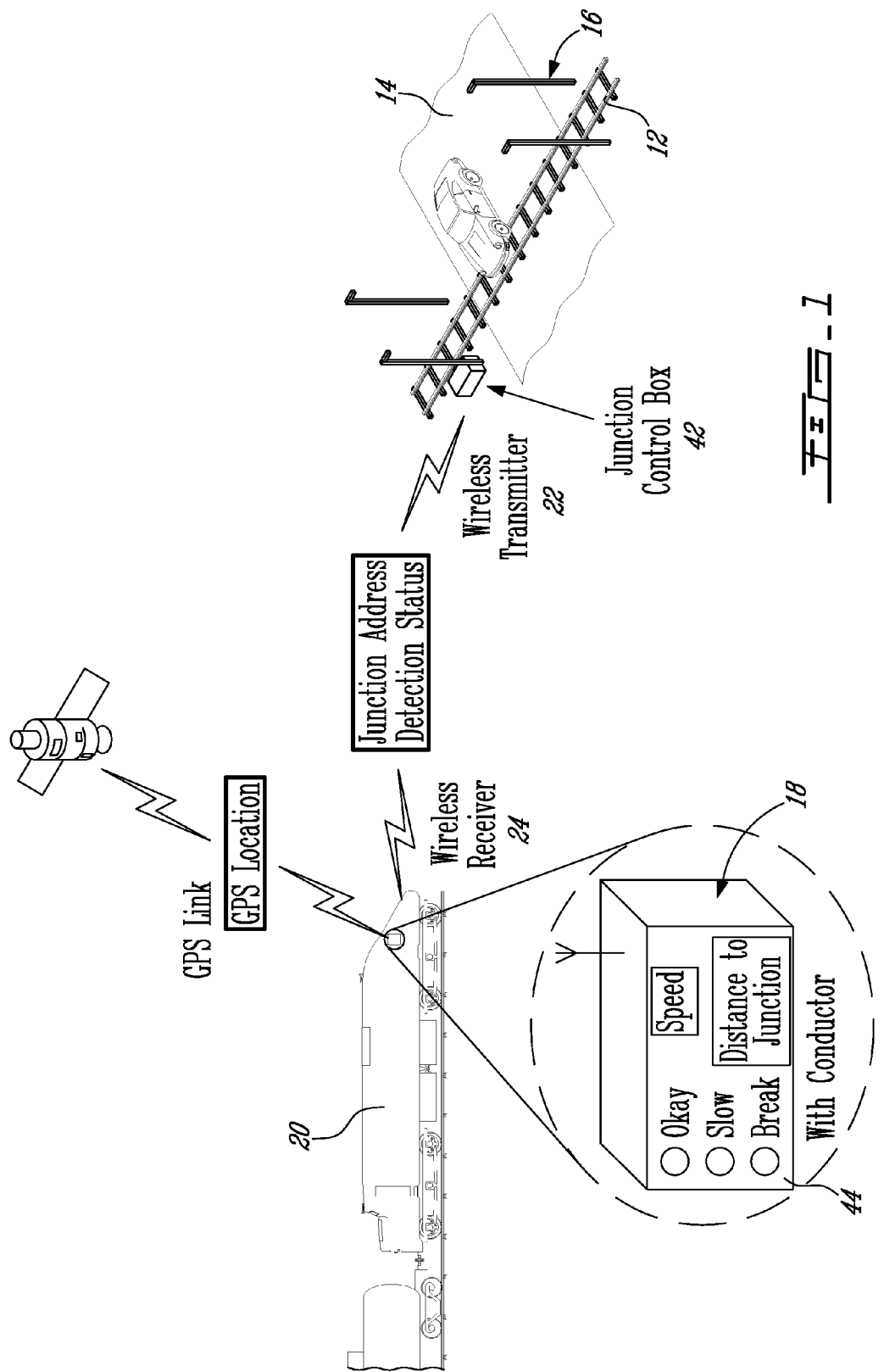
FIG. 1 is a schematic view of a presence detection system for level crossing according to a first illustrative embodiment of the present invention.

A presence detection system 10 for level crossing according to a first illustrative embodiment of the present invention will now be described with reference to FIGS. 1 and 2.

The system 10 allows detecting the crossing of level 12 at the intersection with a road 14.

As will become apparent upon reading the following description, a presence detection system for path crossing according to the present invention is not limited to the railway application and can be used to detect crossing at the intersection of any paths. More generally, it can be used to detect the passage and speed of a vehicle or of any moving body at a certain position along a path. It can detect the presence of a stationary body at the intersection of two paths. It can also detect the intrusion of a body beyond a predetermined position along a path. It can also detect the size of the intruder, and ignore intruders smaller than a predetermined size.

The system 10 includes an ultrasound sensor array 16 positioned at the intersection of two paths, namely a railway track 12 and the road 14, and a controller 18 located in a train 20 and coupled to the ultrasound sensor array 16 via wireless transmitter 22 and receiver and 24 for secured communication, for example, by radio waves.

Figure 2:
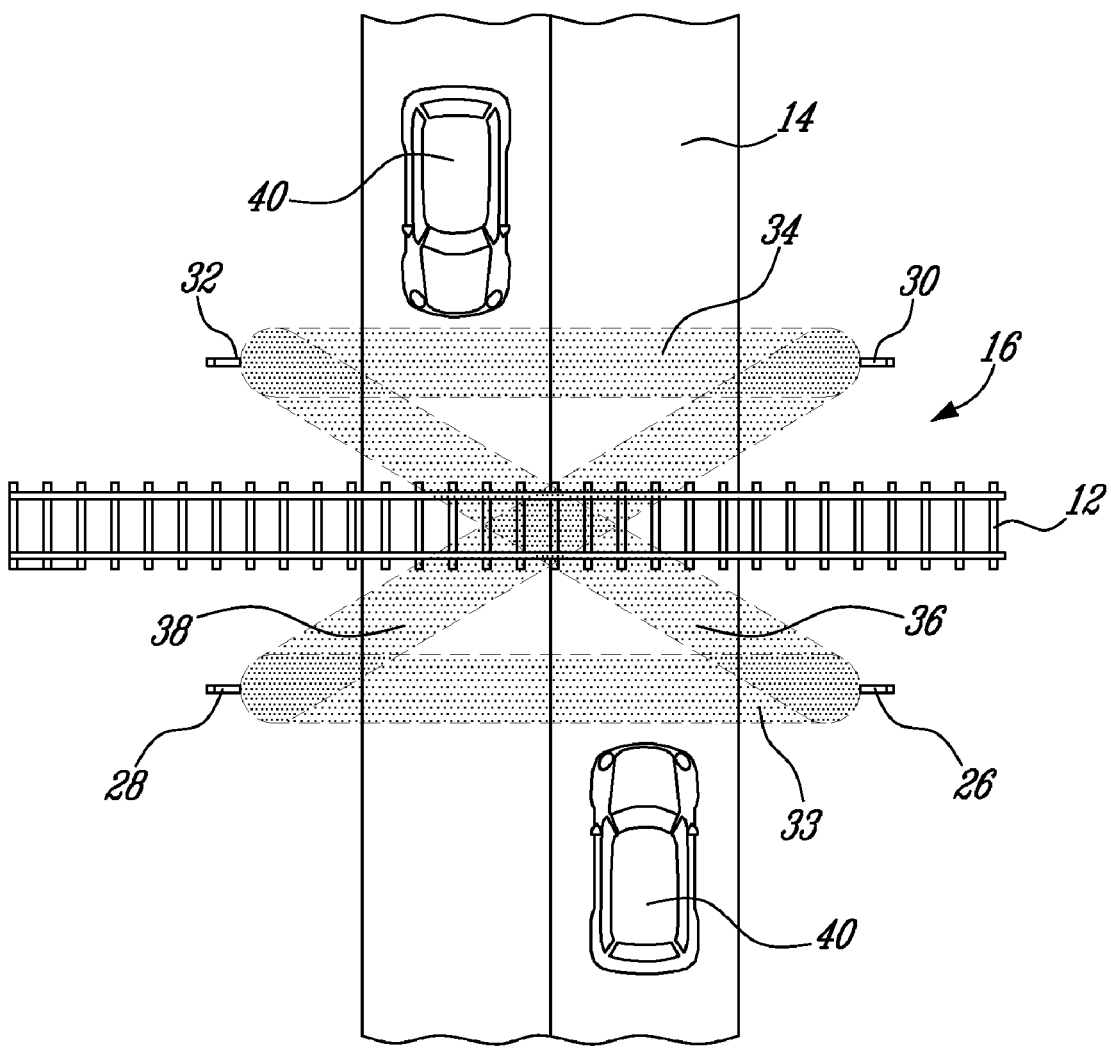
FIG. 2 is a top plan schematic view of a sensor array, part of the presence detection system for level crossing from FIG. 1, illustrating a crossing mode including a beam size that ignores relatively small targets.

Turning now briefly to FIG. 2, the ultrasound sensor array 16 will now be described in more detail.

The ultrasound sensor array 16 includes a first ultrasound sensor in the form of a first pair of ultrasound emitter 26 and receiver 28 positioned on a first side of the railway 12 and a second ultrasound sensor in the form of a second pair of ultrasound emitter and receiver 30 and 32 on the other side of the railway 12.

Each of the of the first and second ultrasound emitters 26 and 30 and first and second receivers 28 and 32 are positioned along the railway 12 for creating respective first and second beams 33-34 therealong. The ultrasound beams 33-34 define respective acoustic lines or virtual gates positioned on opposite sides of the railway track 12 parallel therefrom.

Moreover, the first and second emitters 26 and 30 are configured to further emit ultrasound beams 36 and 38 towards the second and first ultrasound receiver 32 and 26 respectively so as to define an x-shaped detecting pattern. To achieve this dual beam emission, the ultrasound emitter 26 is pivotable between towards the first and second receivers 28 and 32 and the ultrasound emitter 30 is pivotable between towards the second and first receivers 32 and 28. The first and second emitters 26 and 30 are further configured to operate in the well-known pulse and echo mode so as to eliminate clutter, noise and unwanted reflections. All the beams 33-38 intersect the direction defined by the road 14.

It is to be noted that the width of the ultrasound beams have been exaggerated on FIG. 2 for illustrative purposes.

The beams size and/or shape are controlled by the emitter. A beam shaper (not shown) such as the one illustrated in FIG. 12 can also be provided at each emitter 26 and 30 to shape the beams 33-34, 36-38. The width of the beams 33-34, 36-38 defines the minimum size of a target which can be detected by the array 16. Therefore, the width of the detecting beams 33-34 and 36-38 allows filtering out the targets.

Each ultrasound receiver 28 and 32 is configured to emit a unique trigger signal when a body, such as one of the cars 40, crosses one of the two ultrasound beams it is expected to receive. The ultrasound receivers 28 and 32 can recognize a missing beam since each beam emission is precisely timed by the junction control box 42 (see FIG. 1). Other beam discriminating methods can also be used to determinate which beam has been cut when a single receiver receives more than one beam. For example, different frequency modulation can be used for each beam or different time domains. In this last case, the receivers 28 and 30 expect to receive respective signals at known times after the respective emission by the emitters 26 and 30. The receiving angle can also be used to discriminate beams.

A vehicle 40 or any other body is detected whenever one of the acoustic lines 33-34 and 36-38 is cut.

Any portion of the array 16 including an acoustic line defines a detecting zone in the intersection.

As will be illustrated further in, the configuration of the ultrasound sensor array can be modified so as to modify the ultrasound detecting pattern.

Returning to FIG. 1, each junction control box 42 is assigned a unique junction address to allow identifying the junction control box 42 within a network of such junction boxes. Indeed, a railway network and more generally a transport network may include a plurality of ultrasound sensor arrays 16. The use of unique junction addresses allow identifying which virtual gate has been triggered, the reason of which will become more apparent hereinbelow.

Each junction control box 42 further includes a wireless emitter 22 for forwarding the one or plurality of trigger signals and the junction control box address to the controller 18 located in a train 20 heading towards the intersection.

The wireless transmitter 22 can alternatively be provided as an independent device coupled to the junction control box 42 for receiving the one or plurality of trigger signal(s) therefrom for sending to the wireless receiver 24 of the controller 18 located in the train 20 heading towards the intersection.

In case of an electric train, cables can be used as an alternative or in addition to the wireless network for communication between the control box 42 and the train 20.

The controller 18 is coupled to the train control system or to a speedometer operatively mounted to the train 20 for receiving the speed of the train 20 therefrom.

The controller 18 is further configured for GPS (Global Positioning System) determination allowing the controller 18 to determine the precise distance between the train 20 and the junction control box 42 and therefore the corresponding intersection.

The controller 18 further includes or is connected to a display screen 44 or monitor for displaying information relative, for example, to the speed of the train 20, its distance to the nearest junction 42 and intersection and alarm instructions to the train operator depending on the received trigger signals from the junction control box 42.

In operation, the ultrasound sensor array 16 is activated when the junction control box 42 detects the arrival of a train 20. This is achieved either by the on-board controller 18 being programmed with the position of the junction control box 22 relatively to its itinerary or by periodically listening to incoming wireless signals sent from the wireless transmitter 22.

Once the sensor array 16 is activated and a wireless link is created between the train 20 and the array 16, nothing is done unless one or more of the trigger signals is emitted from one of the wireless receivers 28 and 32.

If one of the unique trigger signals is emitted following one of the cars 40 or another body cutting at least one of the beams 33-38 then this information is wirelessly sent to the onboard controller 18 with the junction control box address. The onboard controller 18 then uses the train's speed and the train distance from the junction box 22, as determined using the GPS interface, to calculate the probability of impact with this vehicle 40 or body. This calculation can alternatively be done by the junction box controller 42 that can then forward the assessment to the train controller 18, to a road signaling system (not shown) to help prevent traffic jams, to a control center for further decision, or to any other system which can take action so as to avoid the accident between the train and the vehicle.

The system 10 can be configured so that the array 16 monitors the intersection even when there is no train 20 approaching. The control box 42 which would then receive information from the array 16 that there is a target detected on the rail tracks will send an alarm signal to the monitoring center (not shown) which may then decide to advise any train about the situation and or take any action to clear the rail tracks.

It is to be noted that a sensor array configuration such as the one illustrated in FIG. 2, including at least two beams on each side of the track 12 such as beams 33 and 36, 33 and 38, 34 and 36 or 34 and 38, further allows determining the speed of the vehicle 40. This information can further be used in determining the probability of impact between the vehicle 40 and the train 20. Indeed, by calculating the difference of time between the triggering of the first and second trigger signals corresponding to the respective first and second consecutive beams that are cut, the onboard controller 18 can determine the speed of the vehicle or of any object that consecutively cuts those beams. It is to be noted that this calculation can be done also by the junction control box 42.

In addition or alternatively to its security purposes, the ultrasound sensor array 16 can selectively be activated to monitor the speed of the vehicles 40 which crosses the railway 12 for traffic control or law enforcement purposes.

Returning to the operation of the system 10, the onboard controller 18 can be configured to trigger an alarm which will cause the actuation of the breaking system of the train when the probability of impact between the train 20 and a body detected on the track 12 is beyond a predetermined threshold. According to a more specific embodiment of the present invention, the result of the probability assessment can be binary, i.e. "true" or "false" (impact or no impact).

Since many methods are known in the art to compute such probability of impact, these methods will not be described herein in more details.

The onboard controller 18 can alternatively be configured to emit an audible and/or visual alarm signal in response to a positive probability assessment to alarm the train operator to stop the train.

In both cases, the calculation takes into account the time required to stop the train 20 considering its current speed. The controller 18 can further be configured to monitor or receive information indicative of weather conditions so as to further take into account this information in the probability assessment.

In the case where the controller 18 determines that an impact is probable, the controller 18 can be configured so as to automatically trigger a train sirens (not shown) so as to at least alert of its passage any person or animal on the track.

The expression wireless is not intended here in a limited way. It is to be construed as to include any well-known method of communicating information through the air, including for example radio transmission.

The sensor array 16 can further include a surveillance camera (not shown) allowing to relay images to a remote control center (not shown) for example for recording/documenting purposes following the detection of a target for example.

The ultrasound sensors 26 and 30 of the sensing array 16 can each include both emitters and receivers in a well-known transceiver/transducer configuration, and reflectors can be provided to replace the receivers 28 and 32 so as to complete the ultrasound detecting lines 33 and 34. Dual transceiver/transducers are then provided at each sensor 26 and 30 or the sensors 26 and 30 are made pivotable so as to move between the reflector 28 and 32 in case of sensor 26 and between 32 and 28 in case of sensor 30. According to this specific embodiment, the sensors 26 and 30 operate in pulse mode.

The sensor array 16 is of course not limited to the configuration illustrated in FIG. 2; sensors can be omitted and others can be added so as to yield another sensing pattern as will be described further in. The transducer, emitter, receiver and reflector pattern is established considering a tradeoff between intersection coverage and cost. For example, further ultrasound sensors can be provided upstream from the railway track 12 so as to yield additional ultrasound beam on the road 14 parallel to the beams 33-34 for better assessing a vehicle speed towards the railway track 12.

A presence detection system 46 for level crossing according to a second illustrative embodiment of the present invention will now be described with reference to FIG. 3. Since the detection system 46 is very similar to the system 10, and for concision purposes, only the differences between these two systems will be described further in.

According to the system 46, the train does not include an onboard controller 18. The system 46 further includes however a controllable stop display 48 coupled to the junction control box 42 and being positioned at a predetermined location along the track 12 for alarming the train operator when a vehicle 50 is detected on the track 12 by the sensor array 16 as described with reference with the system 10 illustrated in FIGS. 1-2.

The distance between the stop display 48 and the sensor array 16 is determined considering the average speed of trains 12 so as to allow sufficient time for the train 20 to stop once the presence of a body (an intruder, object, or vehicle) is detected on the track 12 by the sensor array 16.

Figure 3:
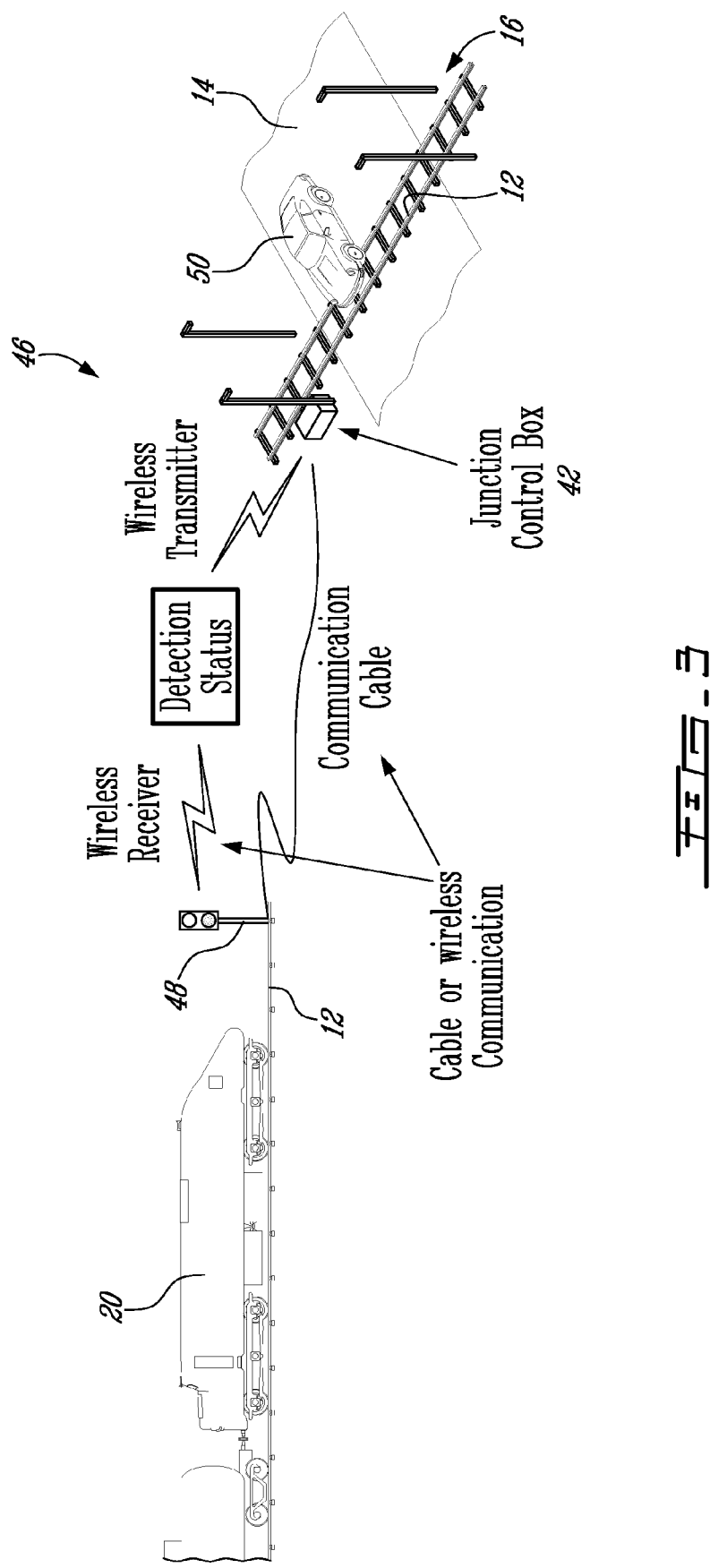
FIG. 3 is a schematic view of a presence detection system for level crossing according to a second illustrative embodiment of the present invention.

As illustrated in FIG. 3, the triggering signal is sent from the junction control box 42 to the stop display 48 via a communication cable, by wireless communication or using any other communication means using a wireless transmitter provided with the junction control box 42 and a wireless receiver provided with controllable stop display 48.

The controllable stop display 48 may take many forms allowing to display visual information accordingly with the trigger signal received from the junction control box 42, and thereby visually requesting the train operator to urgently stop the train 20. For example, a display including conventional green and red lights can be provided. For example, with such a display device 48, whenever the communication is interrupted, both lights can be turned off or a third yellow light (not shown) can be turned on, alarming the operator to be cautious and to slow the train sufficiently to allow enough time to react.

A presence detection system for level crossing according to the present invention can further be configured so as to detect whenever the communication between a junction control box and a train's onboard controller or a controllable stop signal is interrupted so that the system does not assume that none of the virtual gates has been crossed while there is no means to transmit that information.

Even though the system 10 and 46 have been illustrated without conventional pivotable barriers for selectively preventing access to the crossing, they can be further equipped therewith.

A presence detection system for level crossing according to a third illustrative embodiment of the present invention can be provided with the cumulating functionalities of both the system 10 and 46 for improved securities.

Figure 4:
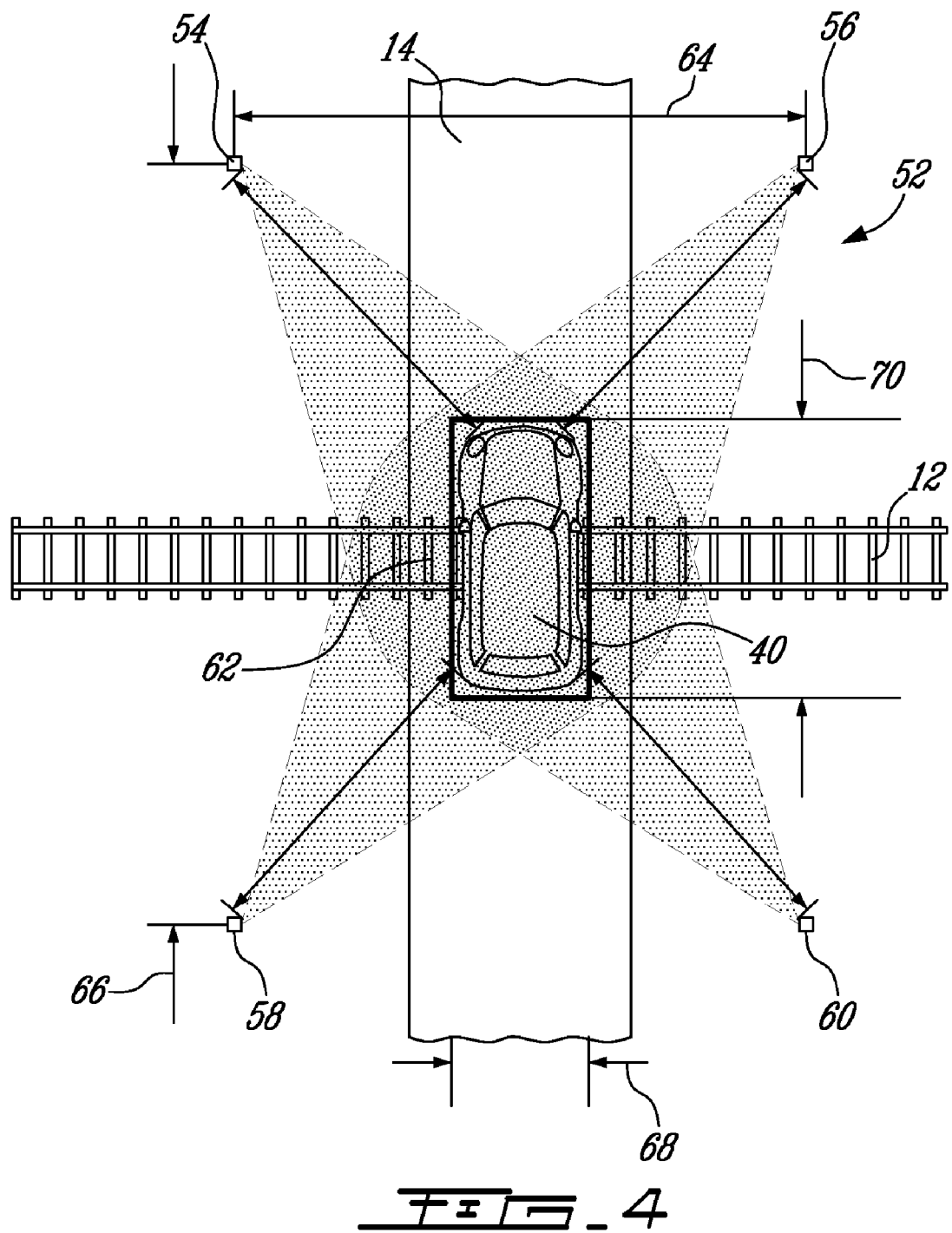
FIG. 4 is a top plan schematic view of a sensor array according to a second illustrative embodiment of a more specific aspect of the present invention illustrating the position and size of a vehicle being measured.

Turning now to FIG. 4 of the appended drawings, an ultrasound sensor array 52 according to a second illustrative embodiment of the present invention will now be described.

The ultrasound sensor array 52 can be used as an alternative to the array 16 in the system 10 or 46 or for detecting the presence of a target or body at the intersection of any other paths.

The array 52 includes first, second, third and fourth ultrasound sensors 54-60 positioned in an X-configuration so that each one of the sensors 54-60 is positioned on a respective side of both the track 12 and road 14.

Each of the four sensors 54-60 are generally aimed at an enlarged area including the level crossing intersection 62 defined by the intersection of the track 12 with the road 14.

The sensors 54-60 are said to operate in a floating cone operation mode wherein they are configured in pulse mode, whereby a respective wide pulse is sent towards the intersection 62 and echoes caused by the ultrasound pulse reflecting on a body, such as the vehicle 40, are collected and analyzed by the junction control box 42 or by another controller such as the controller 18 onboard the train 20. A target is detected whenever its reflection is detected by one of the sensors 54-60. The area covered by the floating cones provided by the sensors 54-60 define the detecting zone.

The configuration of the sensor array 52 allows measuring both the size and speed of the vehicle 40. Indeed, knowing the distance 64 between the first and second sensors 54-56 (or between the third and fourth sensors 58-60) and knowing the distance 66 between the second and third sensors 56-58 (or between the first and fourth sensors 54 and 60), the junction box controller 42 can compute the width 68 and length 70 of the vehicle using the ultrasound echoes received by the four sensors 54-60 from the vehicle 40 using any well-known ultrasound echoes analysis technique.

More precisely, a person skilled in the art will appreciate that providing two sensors or more, on opposite sides of the track 12, such as sensors 56 and 60 or sensors 54 and 58, allows determining the length of a body crossing the track 12. Similarly, providing at least two sensors on opposite sides of the road 14, such as sensors 54 and 46 or sensors 58 and 60, allows determining the width of a body on the road within the array 52, such as the vehicle 40 on the track 12.

It is to be noted that two diametrically opposite pair of sensors, such as sensors 56 and 58 or sensors 54 and 60 might be sufficient to measure most bodies within the detecting zone. However, for irregular shaped body and/or for more precision, at least four ultrasound sensors are used. The movement of the body 40 is calculated based on the variation of its distance to the sensors while its speed is calculated using its change of position and the refreshment rate of the system 52.

Of course, as a person skilled in the art will know, it is not required that the four sensors define a rectangle.

As will now become more apparent upon reading the following descriptions of further illustrative embodiments of sensor arrays according to the present invention, the configuration, number and type of the ultrasound sensors may vary. For example, both sensors defining an acoustic line barrier, as illustrated in FIG. 2, together with sensors defining floating cones, as illustrated in FIGS. 4 and 5, can be used in a same sensor array.

Figure 5:
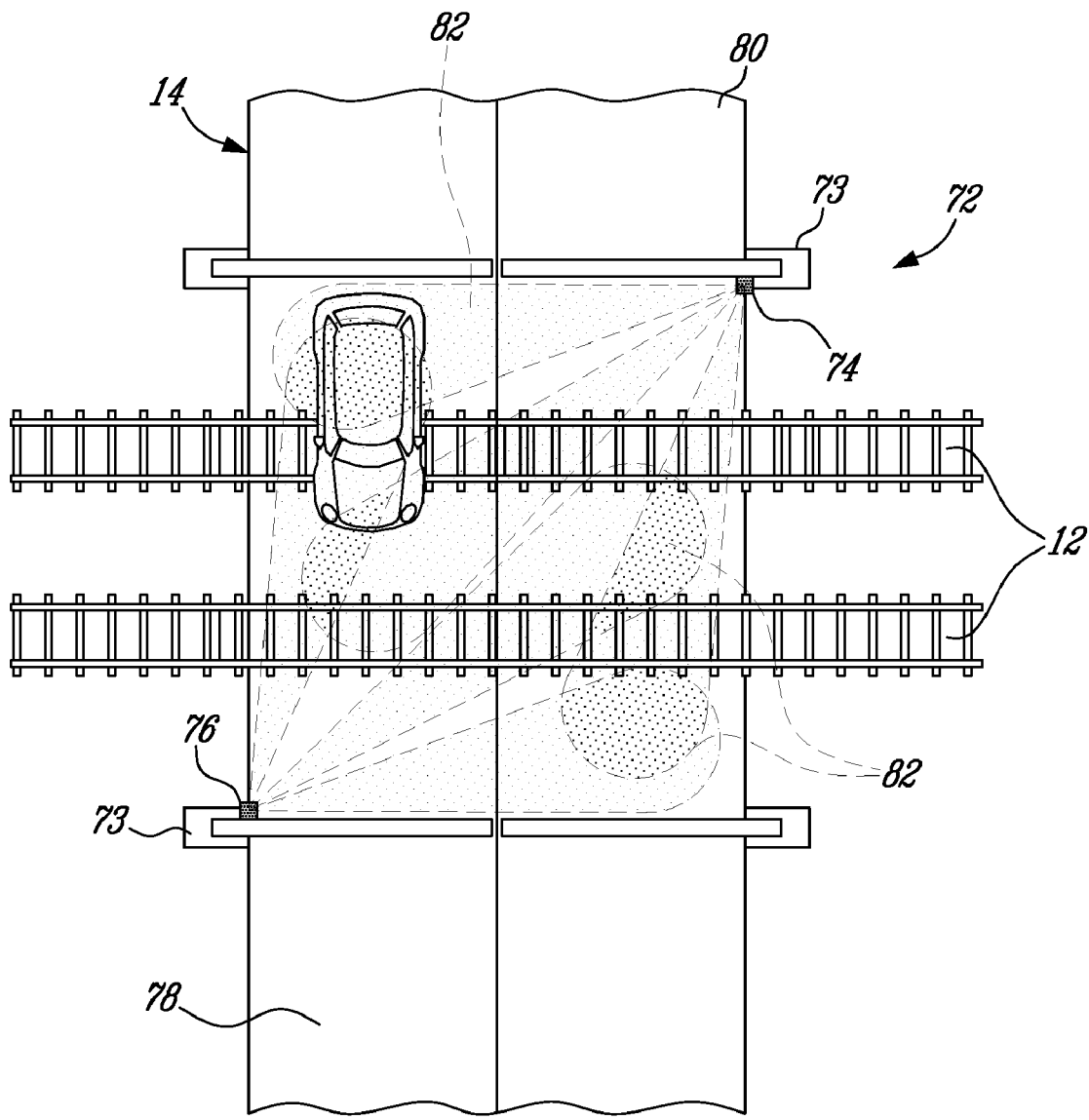
FIG. 5 is a top plan schematic view of an ultrasound sensor array according to a third illustrative embodiment of the present invention, this array allowing to obtained similar information than the array illustrated in FIG. 4.

FIG. 5 illustrates an ultrasound sensor array 72 according to a third illustrative embodiment of the present invention. Since the array 72 is similar to the array 52, only the differences between the two arrays 52 and 72 will be described further in.

The array 72 includes two sensors 74-76, each one mounted to a respective one of four gates 73 positioned along the two ways 78-80 of the road 14 in both sides of the tracks 12.

The sensors 74-76 can be secured to the pole of the gate 73, to the pivotable portion thereof or embedded therein so as to emit ultrasound floating cones 82 in pulse mode towards the intersection. The sensors 74 and 76 can be made orientable so as to periodically scan a predetermined area of the intersection. Each of the sensors 74 and 76 can also be in the form of a sensor assembly including a plurality of sensor, each oriented towards a predetermined area of the intersection.

It is to be noted that the sensors and ultrasound cones and beams are shown throughout the present description only schematically for illustrative purposes.

Figure 6:
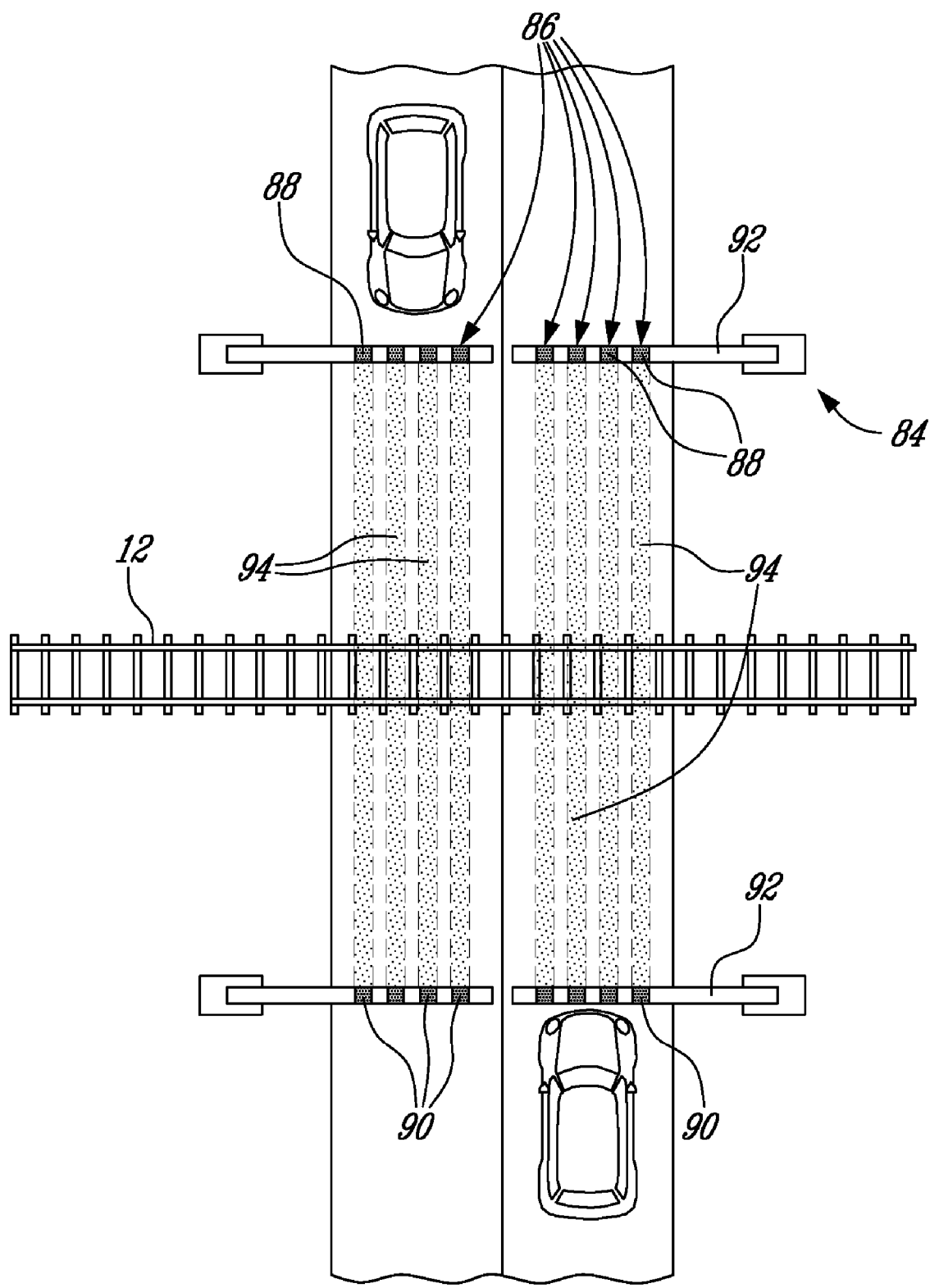
FIG. 6 is a top plan schematic view of an ultrasound sensor array according to a fourth illustrative embodiment of the present invention.

Turning now to FIG. 6, an ultrasound sensor array 84 according to a fourth illustrative embodiment of the present invention will now be described.

The ultrasound sensor array 84 comprises a series of sensor assemblies 86, each including a pair of ultrasound emitter/receiver 88-90. Each emitter 88 is mounted to a first conventional railway crossing barrier 92 positioned on first side of the railway track 12, and a corresponding receiver is mounted to a second conventional barrier positioned on the other side of the track 12 so as to yield an acoustic line 94 perpendicular to the track 12.

As it has been described hereinabove, a target is detected when one of the virtual lines 94 is cut.

The mounting of the sensor assemblies 86 to the pivoting portion of the barrier 92 allows the withdrawal of the beams 94 from the railway crossing when the barriers 92 open.

As a person skilled in the art will appreciate, the precision of the detection of the array 84 can be adjusted by varying the number of ultrasound emitter/receiver pairs 86.

Indeed, the array 84 allows measuring the size of a target indirectly, via the beam size as it has been described hereinabove or by determining the number of beams 94 obscured by the target.

The emitter/receiver pairs 86 can be substituted for transducer/reflector pairs as it has been described hereinabove.

The sensor assemblies 86 can be mounted to the barrier 92 using any suitable means. They can also be embedded therein or attached thereto.

Figure 7:
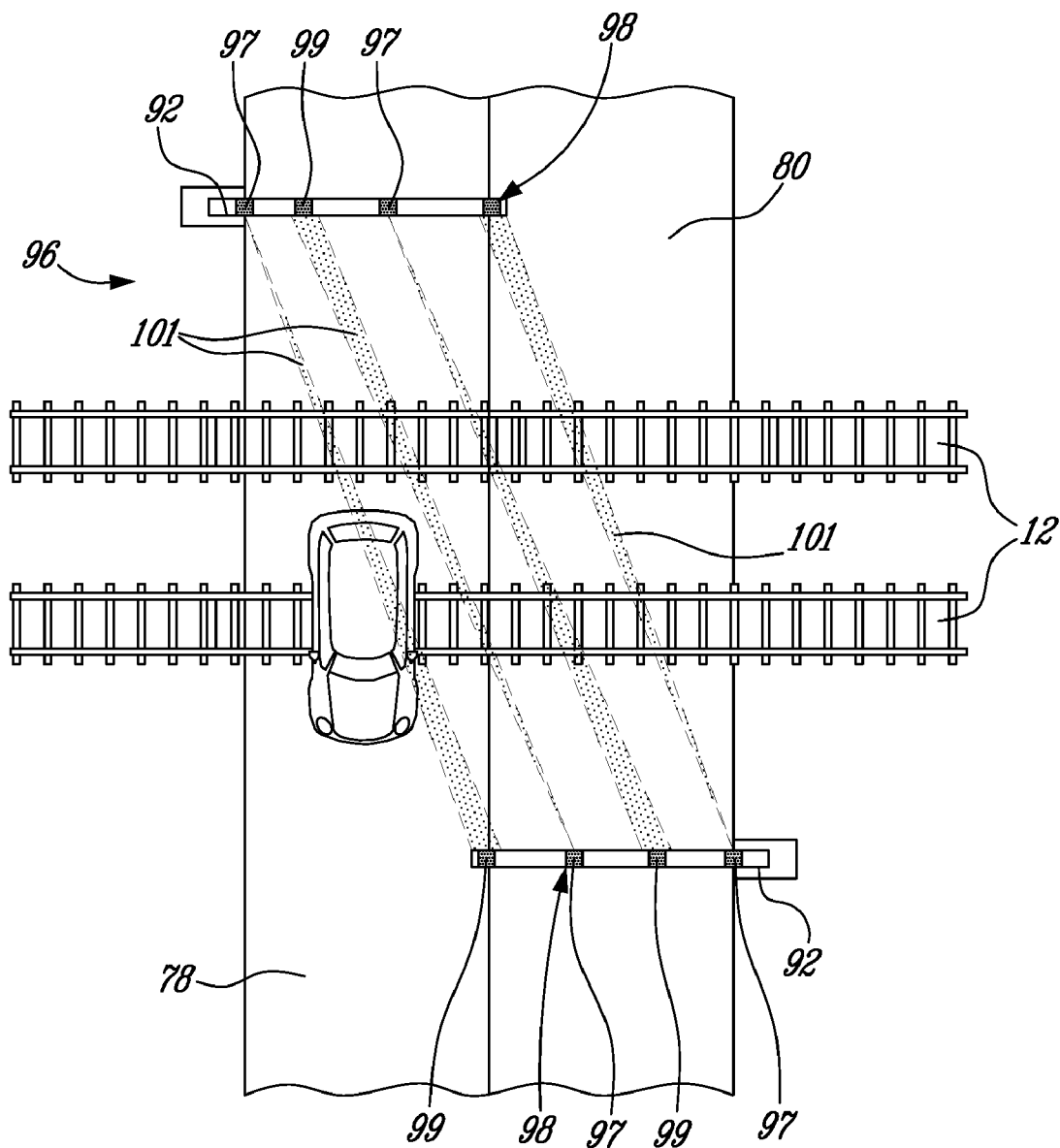
FIG. 7 is a top plan schematic view of an ultrasound sensor array according to a fifth illustrative embodiment of the present invention.

An ultrasound sensor array 96 according to a fifth illustrative embodiment of the present invention will now be described with reference to FIG. 7. Since the array 96 is similar to the array 84 and for concision purposes, only the differences between these two arrays will be described herein in more detail.

The array 96 comprises four (4) sensor assemblies 98, each including an ultrasound transmitter 97 and a reflector 99, each mounted to a respective one of two conventional railway crossing barriers 92. The two barriers 92 are disposed parallel on respective side of railway tracks 14 so that each one selectively blocks one of two facing parallel roadways 78-80 which cross the tracks 14. Each of the four sensor assemblies 98 is configured so as to yield an acoustic detecting line 101 defining an angle with both roadways 78-80 and the railway tracks 12.

An ultrasound sensor array 100 according to a sixth illustrative embodiment of the present invention will now be described with reference to FIG. 8.

The array 100 comprises the array 96, which define the acoustic detecting lines 101, and further comprises two supplementary pairs of ultrasound sensors 102-104, each pair 102-104 configured to emit respective ultrasound floating cones 106-108 in pulse mode towards areas of the intersection which are uncovered by the detecting lines 101.

More specifically, the four sensors 102-104 are secured to the barriers 92 near both longitudinal ends thereof. On each barrier 92, the sensor 102 mounted near the post of the barrier 92 is configured so as to emit a detecting cone 106 generally parallel to the road 78 or 80 and the sensor 104 mounted to the other end of the barrier 92 is configured so as to emit a cone 108 generally parallel to the barrier 92.

As it has been described hereinabove with reference to the sensors 74 and 76, the sensors 102 and 104 can be configured so that the detecting cones 106 and 108 move so as to cover a greater area.

Figure 9:
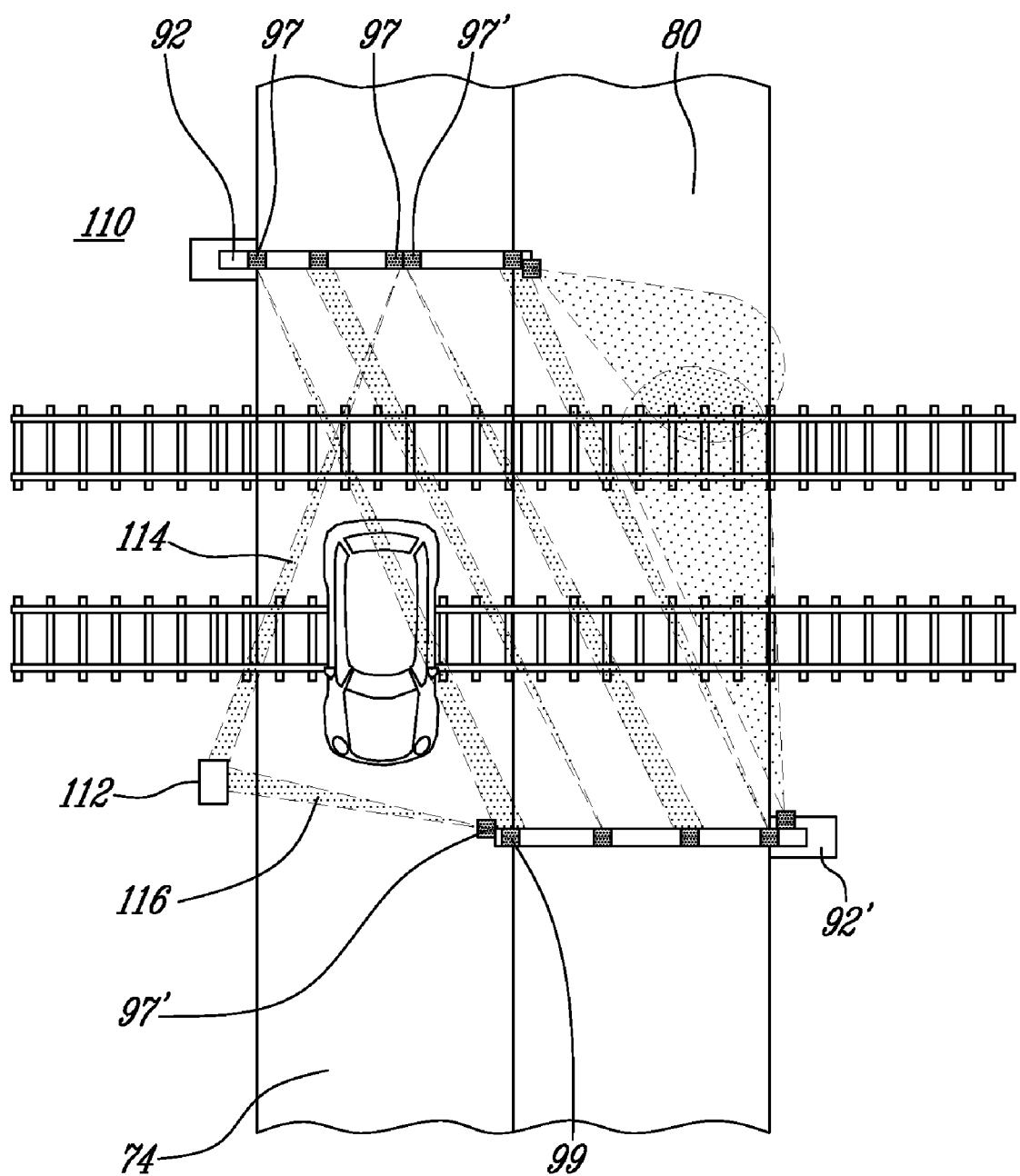
FIG. 9 is a top plan schematic view of an ultrasound sensor array according to a seventh illustrative embodiment of the present invention.

FIG. 9 illustrates an ultrasound sensor array 110 according to a seventh illustrative embodiment of the present invention.

Figure 8:
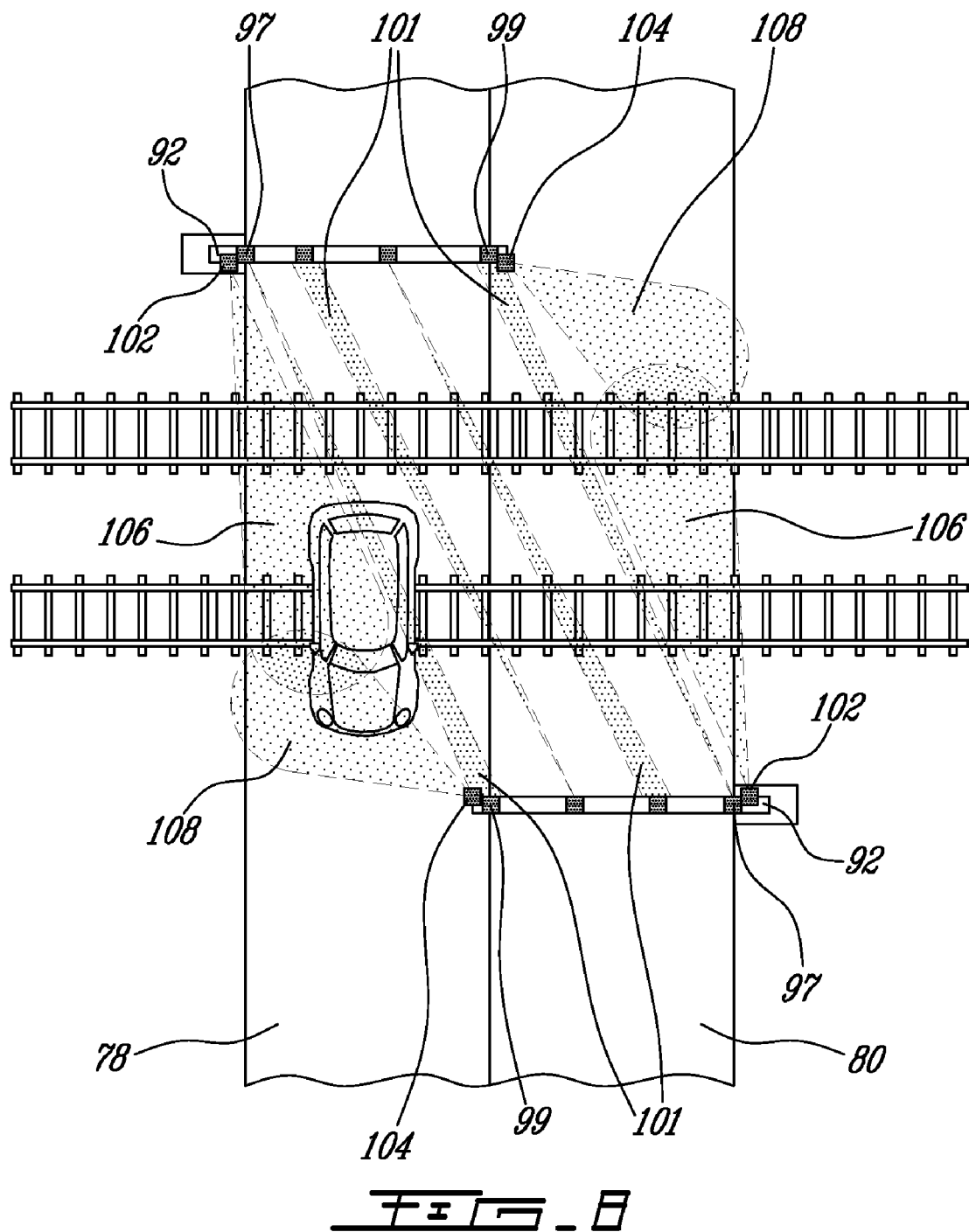
FIG. 8 is a top plan schematic view of an ultrasound sensor array according to a sixth illustrative embodiment of the present invention.

The array 110 is identical to the array 100 illustrated in FIG. 8, with the exception that the sensors 102 and 104, which generate detecting cones 106 and 108 on a first lane 78 of the roadways 78-80 in the array 100 are replaced by transducers 97' similar to the transducers 97 and a reflector or receiver 112 is added on a post so as to further allow creating two complementary acoustic lines 114-116. The first acoustic line 114 extends generally at an angle across the first lane 78 of the roadways 78-80. The second acoustic line 116 extends generally parallel to the second barrier 92' also across the first lane 78.

As can be seen from this last example, adding a reflector, receiver or an emitter on a post allows widening the covering range of the ultrasound sensor array.

Figure 10:
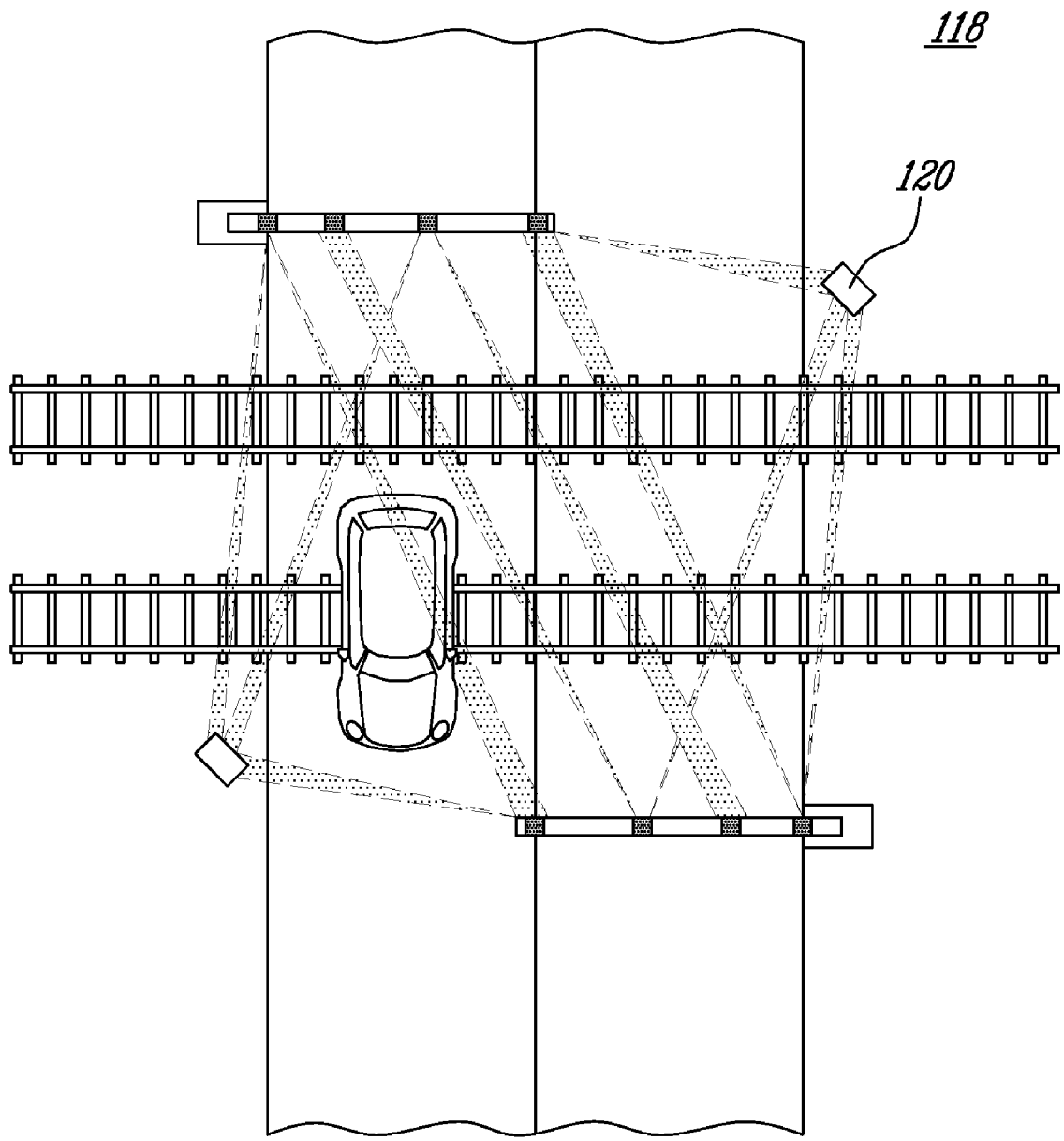
FIG. 10 is a top plan schematic view of an ultrasound sensor array according to an eighth illustrative embodiment of the present invention.

As can be further seen from FIG. 10, illustrating an ultrasound sensor array 118 according to an eighth illustrative embodiment from the present invention, the configuration of the detecting pattern can be modified by adding posts. Also, a single post, such as the post 120 can be used to host more than one reflector/receiver. The post 120 can host any combination of a reflector, transmitter and receiver.

Figure 11:
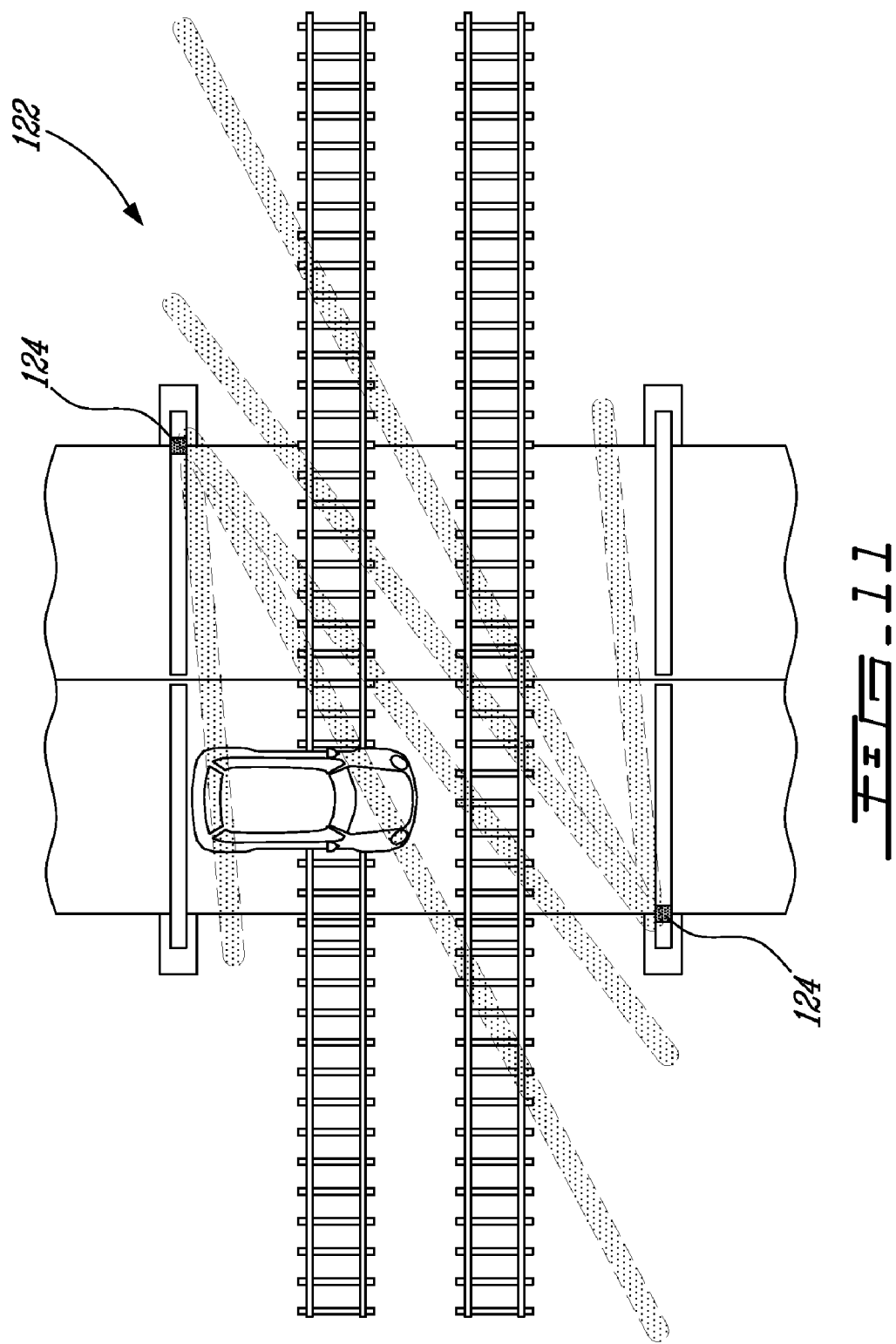
FIG. 11 is a top plan schematic view of an ultrasound sensor array according to a ninth illustrative embodiment of the present invention.

FIG. 11 illustrates an ultrasound sensor array 122 according to a ninth illustrative embodiment of the present invention. Since the array 122 is similar to the array 72 illustrated in FIG. 5, and for concision purposes, only the differences between these two arrays will be described herein in more detail.

Figure 12:
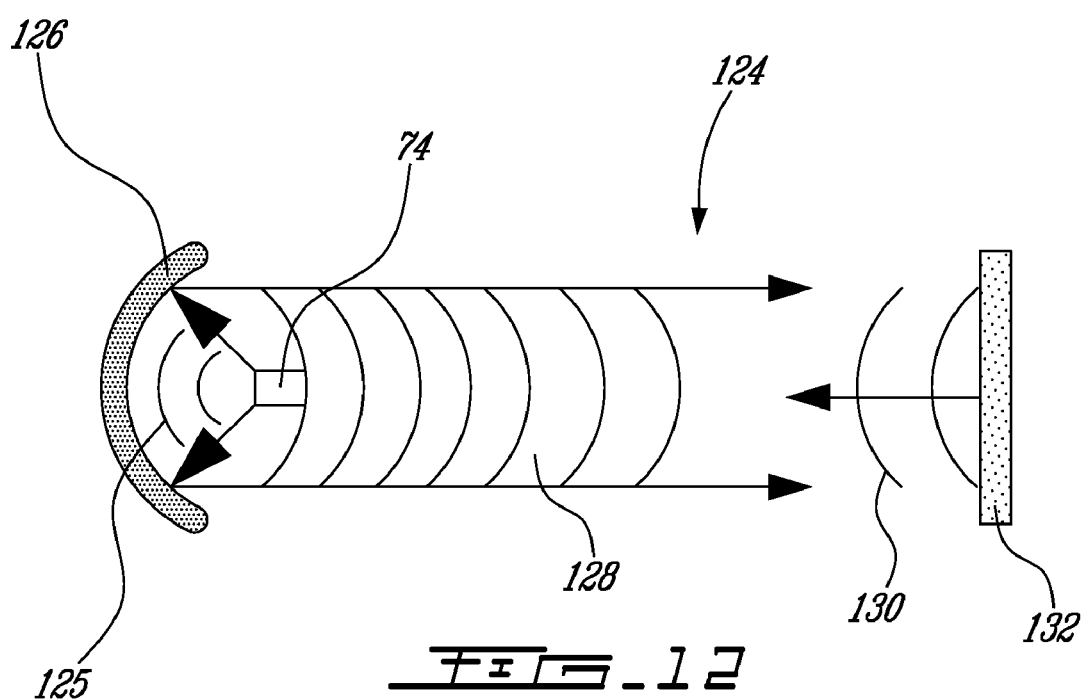
FIG. 12 is a schematic view of a sensor assembly part of the sensor array from FIG. 11 and according to an illustrative embodiment of a more specific aspect of the present invention, showing the use of a beam shaper to define the beam width.

Compare with the array 72, in the array 122, each of the two sensors 74 and 76 is replaced by a sensor assembly 124 which will now be described in more detail with reference to FIG. 12.

The sensor assembly 124 includes a transducer 74 and a concave dish 126, which acts as a beam shaper, operatively assembled together so that the transducer 74 transmit a primary beam 125 towards the dish 126, yielding an ultrasound detecting beam 128.

In operation, reflections 130 coming from a target 132 would first hit the dish and then be focused to the transducer 74.

A person skilled in the art would appreciate that such a sensor assembly 124 can be used with a receiver or a reflector (both not shown) to create acoustic detecting lines.

The width of the beam can be adjusted by proper selection of the size of the dish 126, the emission angle of the sensor and the distance to the dish.

The sensor assembly 124 can be used adjacent a surface, such as the ground, parallel therefrom, without causing the usual clutters in the measured echoes.

Similarly to what has been described with reference to FIG. 5, the sensor assembly can be made pivotable so as to cover a wider detecting area.

Figure 13:
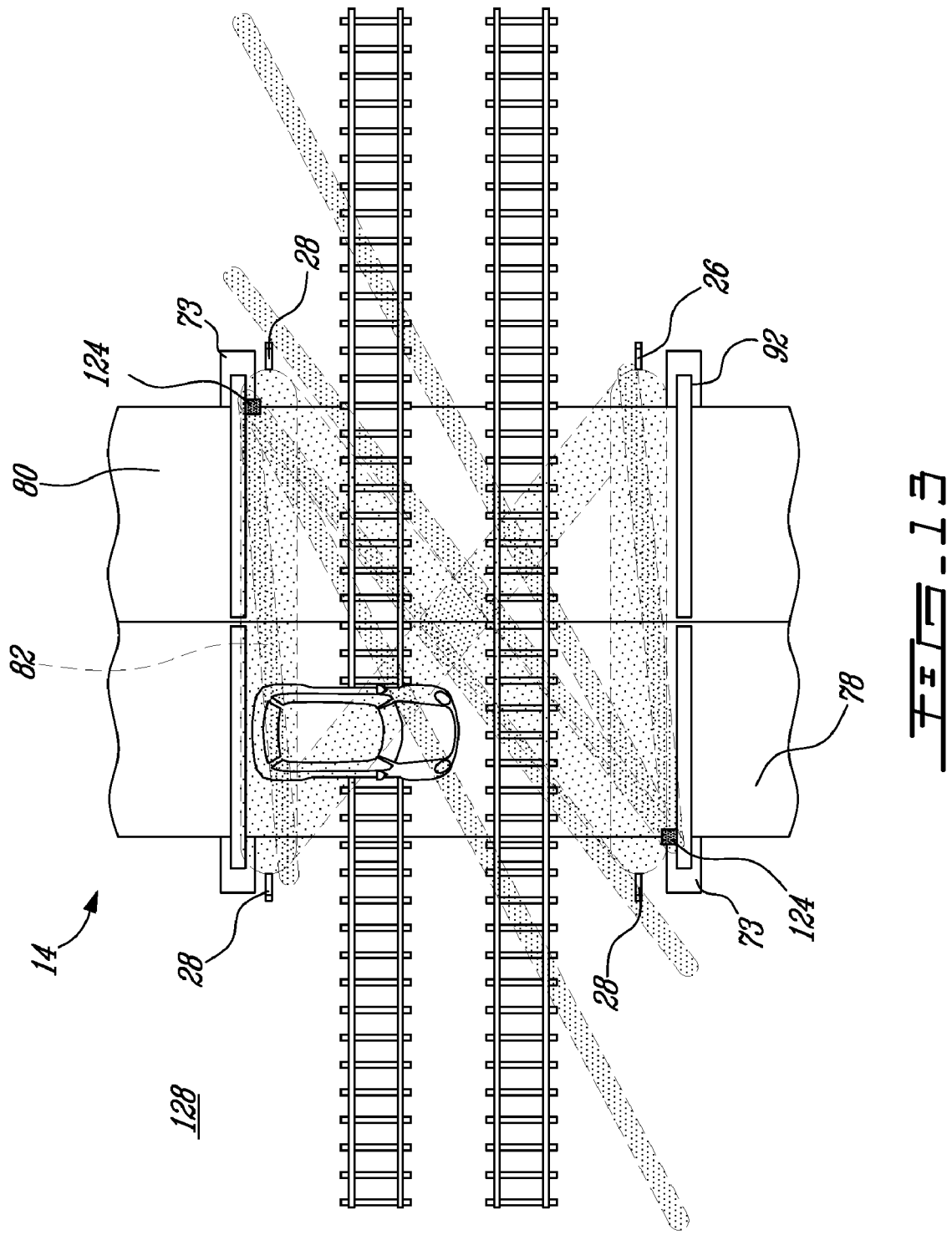
FIG. 13 is a top plan schematic view of an ultrasound sensor array according to a tenth illustrative embodiment of the present invention.

As illustrated in FIG. 13, showing an ultrasound sensor array 128 according to a tenth illustrative embodiment of the present invention, an array including detector assemblies 124, such as the array 122 can be used in addition to a sensor array including acoustic line barriers such as the array 16 illustrated in FIG. 2. The number, orientation and configuration of the acoustic detecting lines and parallel detecting beams can of course vary.

Figure 14:
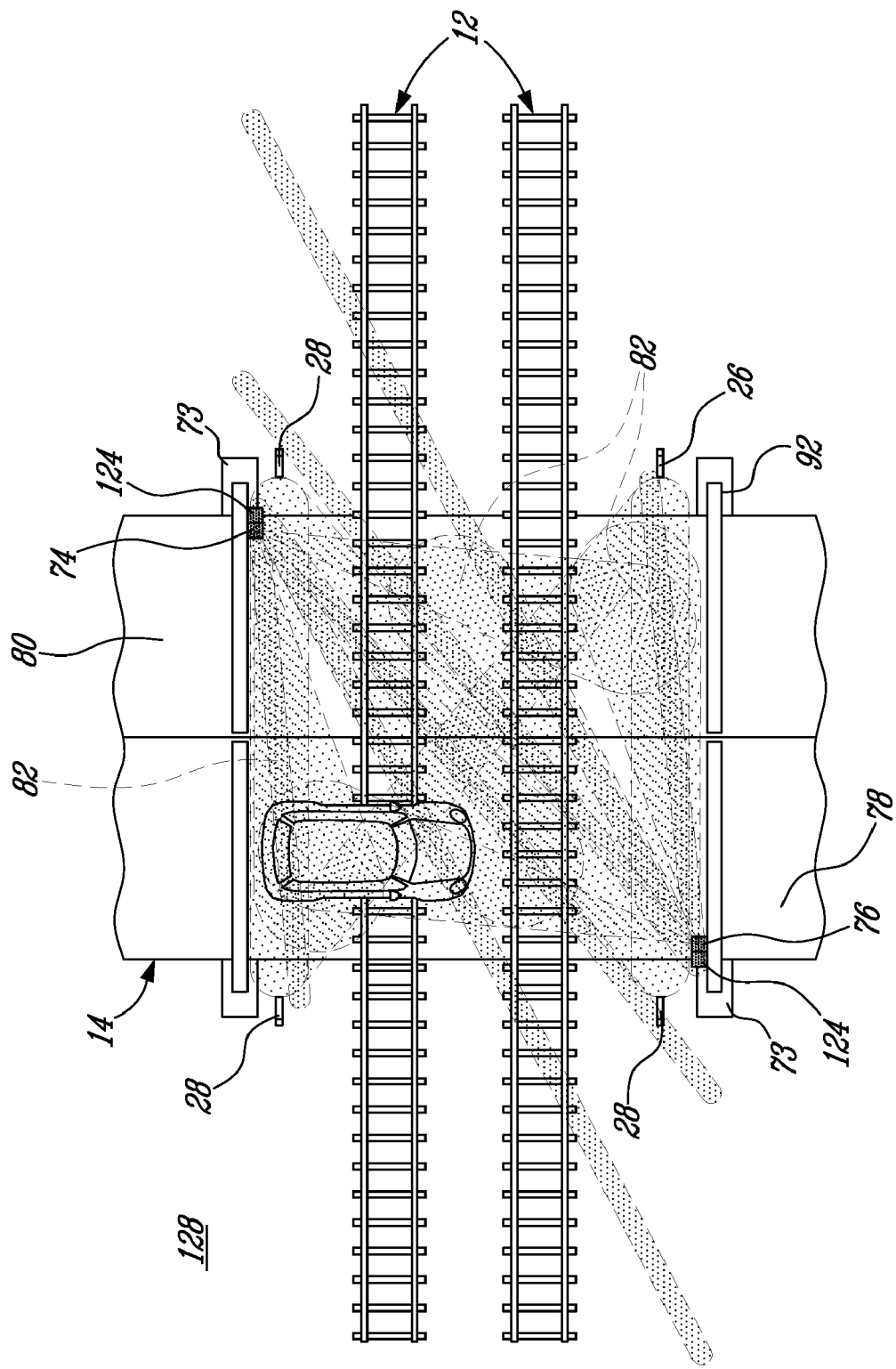
FIG. 14 is a top plan schematic view of an ultrasound sensor array according to an eleventh illustrative embodiment of the present invention.

Also as can be seen in FIG. 14, illustrating an ultrasound sensor array 130 according to an eleventh illustrative embodiment of the present invention, a sensor array such as the sensor array 128 can further be equipped with a sensor array 72 such as the one described with reference to FIG. 5, including sensors emitting ultrasound floating cones. The number of such sensors may be adjusted to provide a safer array depending also on the number of acoustic lines and parallel detecting beams.

An ultrasound sensor array for detecting the presence or crossing at the intersection of two paths, such as at a railway crossing, according to the present invention can be provided with any other combinations of ultrasound sensors and sensor assemblies creating acoustic detecting line, ultrasound floating cones and ultrasound parallel beams.

Figure 15:
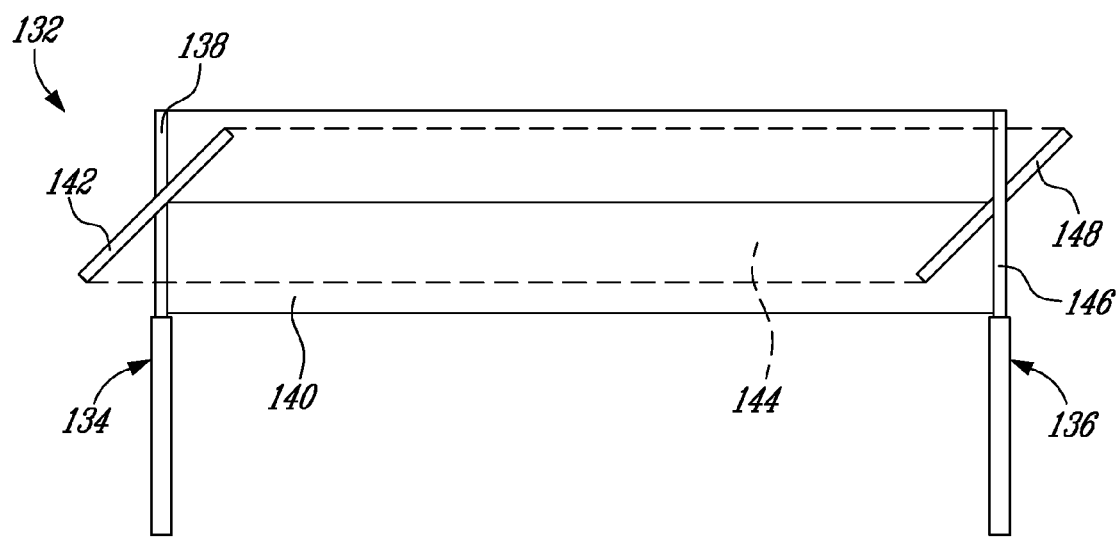
FIG. 15 is a top plan schematic view of an ultrasound sensor array according to a twelfth illustrative embodiment of the present invention.

Turning now to FIG. 15 of the appended drawings, an ultrasound sensor array 132 according to a twelfth illustrative embodiment of the present invention will now be described.

The ultrasound sensor array 132 comprises an ultrasound emitter assembly 134 and an ultrasound receiver assembly 136.

The ultrasound emitter assembly 134 includes a first series of ultrasound emitters (not shown) mounted to a first post 138, which, according to the illustrated embodiment is vertical, so as to be aligned and so as to define a first detection plane 140.

The ultrasound emitter assembly 134 further includes a second series of ultrasound emitters (not shown) mounted to a second post 142, which is secured to the first post 138 so as to define an angle therewith, for aligning the second series of ultrasound emitters therealong for defining a second detection plane 144.

The ultrasound receiver assembly 136 includes a third post 146 generally aligned with the first post 138 and including a first series of ultrasound receivers or reflectors for defining the first detecting plane 140 with the first series of ultrasound emitters. The ultrasound receiver assembly 136 further includes a fourth post 148 generally aligned with the second post 142 and including a second series of ultrasound receivers or reflectors for defining the second detecting plane 144 with the first series of ultrasound emitters.

Any one of the above-mentioned ultrasound detecting mode of operation can be implemented with the sensor array 132, including standing waves and pulse modes. Also, as mentioned hereinabove, ultrasound receivers or reflectors can be provided opposite the ultrasound emitters for defining the ultrasound detection planes 140 and 144.

The ultrasound sensor array 132 allows measuring the height, width, length and speed of the body crossing the array 132. The array 132 further allows determining the direction of movement of a body crossing the array 32.

Indeed, each pair of opposite first and second ultrasound emitters and receivers defines a series of aligned lines of detection as described hereinabove with reference with the previous illustrated embodiments. As it has been described hereinabove, providing two of such detecting lines along the traveling direction of a body allows determining the speed of the body by calculating the delay between the two or more line crossings. The dimensions of the body along that direction can further be determined by calculating the time a detecting line remains cut providing the speed of the vehicle.

Moreover, providing a plurality of aligned sensors so as to define a detecting plane 140 or 144 allows determining the dimension of the body along that plane. The precision of the measurement depends one the density of sensors along the posts 138, 142, and 146-148.

Providing a presence detection system 46 for level crossing according to the present invention with a sensor array such as the array 132 allows triggering alarm depending on the size of the body detected. For example, the junction control box 42 can be programmed so as not to trigger an alarm for object smaller than a human.

Each of the ultrasound receivers from each of the third and fourth posts 146 and 148 is configured to emit a unique trigger signal when its respective beam is cut. Of course, when reflectors are used on the posts 146 and 88, the unique trigger signals are associated to the emitters mounted to the first and second posts 138 and 142.

Figure 16:
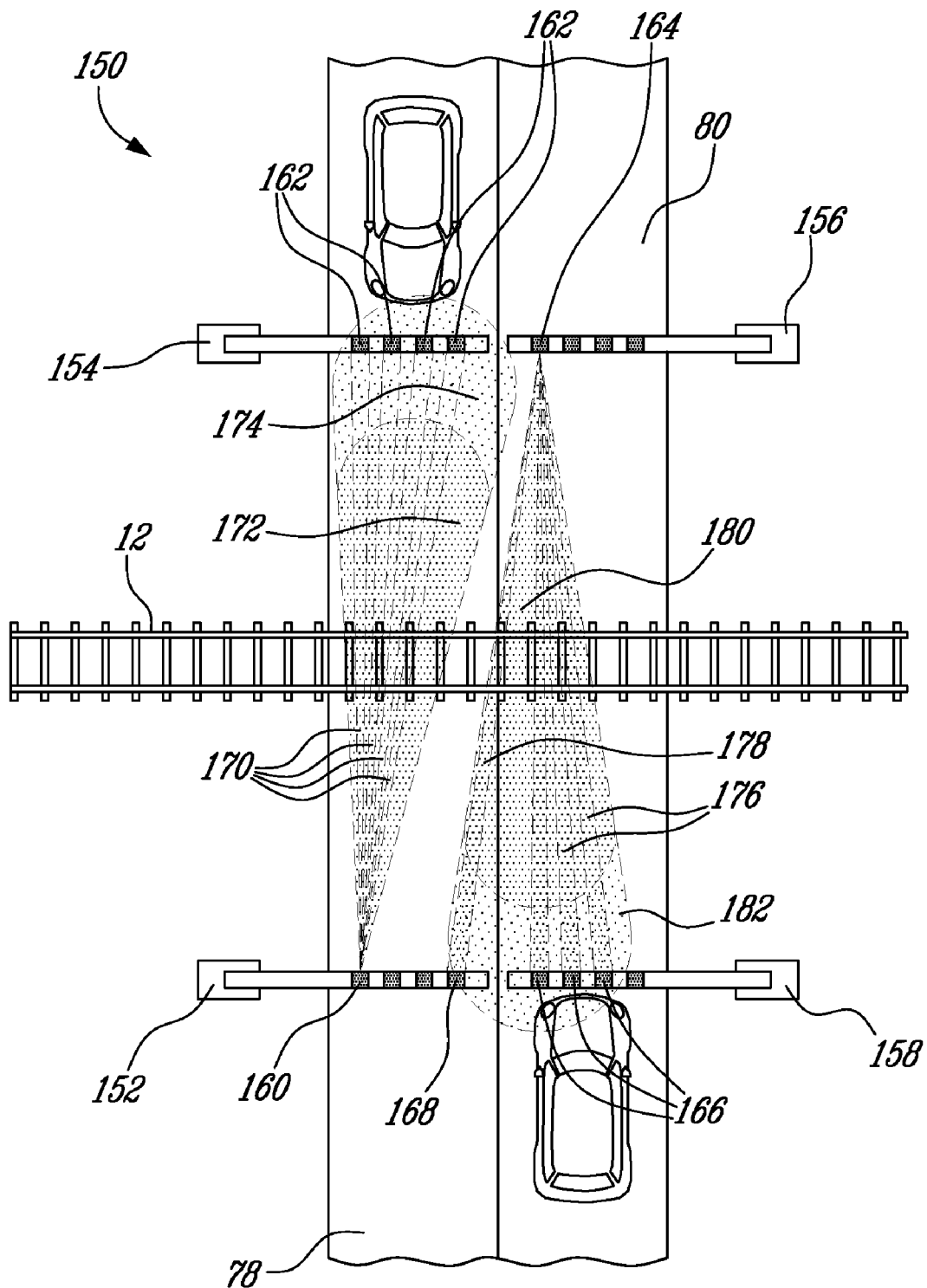
FIG. 16 is a top plan schematic view of an ultrasound sensor array according to a thirteenth illustrative embodiment of the present invention, illustrating the used of a dual detecting mode.

An ultrasound sensor array 150 according to a thirteenth illustrative embodiment of the present invention will now be described with reference to FIG. 16. The array 150 allows operating in a dual mode, in addition to the regular detecting mode.

The array 150 is implemented at the intersection of roadways 78-80 and a railway track 12, including two facing pair of pivotable gates 152-154 and 156-58 which cross respective roads 78 and 80 on respective side of the track 12 in a conventional pattern.

The array 150 comprises a first ultrasound emitter 160 emitting a plurality of detecting beams 170 towards a plurality of receivers 162. The receivers are positioned on the gate 154 which is located on the opposite side of the track 12. According to a first mode of operation, the size of a target detected by these beams 170 can be approximated by the number of beams 170 that are cut by the target detected. The same transducer 160 is configured to emit first and second aligned floating cones 172 and 174 as defined hereinabove, which allows determining in a second mode of operation, for example, the speed of a target detected by such cones 172-174. According to a further illustrative embodiment of the present invention (not shown), different transducers are provided to create the floating cones and the detecting lines.

As it has been described hereinabove, the emitter 160 and receiver 162 can be embedded in the gates 152 and 154 or mounted thereto using any well-known attaching means.

Since it is believed to be well-known in the art to couple or connect the emitter and/or receiver to a junction control box or to any other controller, such coupling or connecting means will not be described herein.

Similarly and symmetrically to what has been described with reference to the first side 78 of the roadways 78-80, the gate 156 includes an emitter/transducer 164 which emits a plurality of detecting lines 176 towards a receiver mounted to the facing gate 158 with an additional detecting line 178 towards a receiver 168 mounted to the diagonally opposite gate 152. The emitter/transducer 164 further creates two aligned detecting cones 176-178.

Similarly to what has been described with reference to the array 150, a plurality of detecting lines can be created with a single ultrasound receiver configured to receive a plurality of ultrasound beams from a plurality of ultrasound emitters.

Although the present invention has been described hereinabove by way of illustrated embodiments thereof, it can be modified, without departing from the spirit and nature of the subject invention as defined in the appended claims.

What is claimed is:

1. A system for detecting a presence of a body at an intersection between first and second paths, the system comprising:
    an ultrasound sensor array for defining a detecting zone at the intersection of the first and second paths and for emitting a first trigger signal when the body is in the detecting zone; the ultrasound sensor array including a first sensor assembly that creates a first acoustic line over the intersection; the first acoustic line intersecting a direction defined by the first path; the first trigger signal being emitted when the first acoustic line is cut; wherein the sensor array including at least one second sensor assembly that emits a first ultrasound floating cone towards a portion of the intersection; the first trigger signal being further emitted when the body contacts the first ultrasound floating cone; and
    a controller coupled to the ultrasound sensor array for receiving the first trigger signal and for emitting an alarm signal indicative of the first trigger signal.

2. A system as recited in claim 1, wherein the at least one second sensor assembly includes a plurality of second sensor assemblies, each oriented towards a different portion of the intersection.

3. A system as recited in claim 1, wherein the at least one second sensor assembly includes an ultrasound sensor configured for operation in pulse mode whereby a wide pulse is emitted towards the portion of the intersection.

4. A system for detecting a presence of a body at an intersection between first and second paths, the system comprising:
    an ultrasound sensor array for defining a detecting zone at the intersection of the first and second paths and for emitting a first trigger signal when the body is in the detecting zone; the ultrasound sensor array including a first sensor assembly that creates a first acoustic line over the intersection at a first location along the first path and a second sensor assembly that creates a second acoustic line which intersects the direction defined by the first path at a second position along the first path; and
    a controller coupled to the ultrasound sensor array for receiving the first trigger signal and for emitting an alarm signal indicative of the first trigger signal; the first trigger signal being emitted when the first acoustic line is cut; the controller being further for determining the speed and direction of the body between the first and second acoustic lines by determining a time between a consecutive cutting of the first and second acoustic lines.

5. A system as recited in claim 1, wherein the first sensor assembly includes an ultrasound transducer and an ultrasound reflector aligned with the ultrasound transducer so as to create the first acoustic line therewith; the ultrasound transducer emitting the first trigger signal when the acoustic line is cut.

6. A system as recited in claim 1, wherein the first sensor assembly includes an ultrasound emitter and an ultrasound receiver aligned with the ultrasound emitter so as to create the first acoustic line therewith; one of the ultrasound emitter and receiver emitting the first trigger signal when the acoustic line is cut.

7. A system as recited in claim 1, wherein the first sensor assembly is adjacent the second path on a first side thereof.

8. A system as recited in claim 7, wherein the ultrasound sensor array further includes a third sensor assembly that creates a second acoustic line which intersect the direction defined by the first path and which is adjacent the second path on a second side thereof; the first trigger signal being further emitted when the second acoustic line is cut.

9. A system as recited in claim 8, wherein the first and second acoustic lines are generally parallel to the second path.

10. A system as recited in claim 9, wherein the first and third sensor assemblies further create third and fourth acoustic lines defining an x-shaped pattern between the first and second acoustic lines; the first trigger signal being further emitted when any one of the third and fourth acoustic lines is cut.

11. A system for detecting a presence of a body at an intersection between first and second paths, the system comprising:
  an ultrasound sensor array for defining a detecting zone at the intersection of the first and second paths and for emitting a first trigger signal when the body is in the detecting zone; the ultrasound sensor array including a first sensor assembly that creates a first acoustic line over the intersection; the first trigger signal being emitted when the first acoustic line is cut; the first sensor assembly being adjacent the second path on a first side thereof; the first acoustic line intersecting a direction defined by the first path; the ultrasound sensor array further including a second sensor assembly that creates a second acoustic line which intersect the direction defined by the first path and which is adjacent the second path on a second side thereof; the first trigger signal being further emitted when the second acoustic line is cut; the first and second acoustic lines being generally parallel to the second path; the first and second sensor assemblies further creating third and fourth acoustic lines defining an x-shaped pattern between the first and second acoustic lines; the first trigger signal being further emitted when any one of the third and fourth acoustic lines is cut; wherein the first sensor assembly includes a first ultrasound emitter positioned on a first side of both the first and second paths and a first ultrasound receiver positioned on both the first side of the first path and on a second side of the first path; the second sensor assembly including a second ultrasound receiver positioned on both the second side of the first path and on a second side of the second path and a second ultrasound emitter positioned on both the second side of the first path and the first side of the second path; both the first and second emitters being pivotable between the first and second receivers; and
  a controller coupled to the ultrasound sensor array for receiving the first trigger signal and for emitting an alarm signal indicative of the first trigger signal.

12. A system as recited in claim 1, wherein the first sensor assembly creates a series of acoustic lines defining the detecting zone; the first trigger signal being emitted when any one of the acoustic lines is cut.

13. A system as recited in claim 12, wherein the acoustic lines cross the first path.

14. A system as recited in claim 13, wherein the acoustic lines are generally aligned and superimposed with the second path.

15. A system as recited in claim 12, wherein each of the acoustic lines is created by an ultrasound transducer and an ultrasound reflector aligned with the ultrasound transducer; the ultrasound transducer emitting the first trigger signal when the acoustic line is cut.

16. A system for detecting a presence of a body at an intersection between first and second paths, the system comprising:
  an ultrasound sensor array for defining a detecting zone at the intersection of the first and second paths and for emitting a first trigger signal when the body is in the detecting zone; the ultrasound sensor array including a first sensor assembly that creates a series of acoustic lines defining the detecting zone; each of the acoustic lines being created by an ultrasound transducer and an ultrasound reflector aligned with the ultrasound transducer; the ultrasound transducer emitting the first trigger signal when any one of the acoustic lines is cut; at least one of the ultrasound transducer and reflector is mounted to a pivotable gate; and
  a controller coupled to the ultrasound sensor array for receiving the first trigger signal and for emitting an alarm signal indicative of the first trigger signal.

17. A system as recited in claim 15, wherein the ultrasound transducers and reflectors are positioned on a respective side of the first path.

18. A system as recited in claim 12, wherein each of the acoustic lines is created by an ultrasound emitter and an ultrasound receiver aligned with the ultrasound emitter; one of the ultrasound emitter and receiver emitting the first trigger signal when the acoustic line is cut.

19. A system for detecting a presence of a body at an intersection between first and second paths, the system comprising:
  an ultrasound sensor array for defining a detecting zone at the intersection of the first and second paths and for emitting a first trigger signal when the body is in the detecting zone; the ultrasound sensor array including a first sensor assembly that creates a series of acoustic lines defining the detecting zone; the first trigger signal being emitted when any one of the acoustic lines is cut; each of the acoustic lines being created by an ultrasound emitter and an ultrasound receiver aligned with the ultrasound emitter; one of the ultrasound emitter and receiver emitting the first trigger signal when the acoustic line is cut; at least one of the ultrasound emitter and receiver being mounted to a pivotable gate; and
  a controller coupled to the ultrasound sensor array for receiving the first trigger signal and for emitting an alarm signal indicative of the first trigger signal.

20. A system for detecting a presence of a body at an intersection between first and second paths, the system comprising: an ultrasound sensor array for defining a detecting zone at the intersection of the first and second paths and for emitting a first trigger signal when the body is in the detecting zone; the ultrasound sensor array including a first sensor assembly that creates a series of acoustic lines defining the detecting zone; the first trigger signal being emitted when any one of the acoustic lines is cut; further comprising a second sensor assembly that creates at least one ultrasound floating cone which further defines the detecting zone; and
  a controller coupled to the ultrasound sensor array for receiving the first trigger signal and for emitting an alarm signal indicative of the first trigger signal.

21. A system as recited in claim 12, wherein the acoustic lines are created by a plurality of ultrasound emitters and at least one ultrasound receiver; each of the plurality of ultrasound emitters being aligned with one of the at least one ultrasound receivers, yielding an ultrasound sensor creating one of the acoustic lines and emitting the first trigger signal when the acoustic line is cut.

22. A system as recited in claim 12, wherein the acoustic lines are created by a plurality of ultrasound receivers and at least one ultrasound emitter; each of the plurality of ultrasound receivers being aligned with one of the at least one ultrasound emitter, yielding an ultrasound sensor creating one of the acoustic lines and emitting the first trigger signal when the acoustic line is cut.

23. A system for detecting a presence of a body at an intersection between first and second paths, the system comprising:
    an ultrasound sensor array for defining a detecting zone at the intersection of the first and second paths and for emitting a first trigger signal when the body is in the detecting zone; the sensor array including at least one sensor assembly that emits a first ultrasound floating cone towards a portion of the intersection; the first ultrasound floating cone defining at least part of the detecting zone; the first trigger signal being emitted when the body is at least partially in the first ultrasound floating cone; and
    a controller coupled to the ultrasound sensor array for receiving the first trigger signal and for emitting an alarm signal indicative of the first trigger signal.

24. A system as recited in claim 23, wherein the at least one sensor assembly includes a plurality of sensor assemblies, each oriented towards a different portion of the intersection.

25. A system as recited in claim 23, wherein the at least one sensor assembly includes a first sensor located on a first side of the first path that emits a first ultrasound floating cone towards the second path and a second sensor located on a second side of the first path that emits a second ultrasound floating cone towards the second path.

26. A system for detecting a presence of a body at an intersection between first and second paths, the system comprising:
    an ultrasound sensor array for defining a detecting zone at the intersection of the first and second paths and for emitting a first trigger signal when the body is in the detecting zone; the at least one sensor assembly including a first sensor located on a first side of the first path that emits a first ultrasound floating cone towards the second path and a second sensor located on a second side of the first path that emits a second ultrasound floating cone towards the second path; the first and second ultrasound floating cones defining at least part of the detecting zone; the first trigger signal being emitted when the body is at least partially in one of the first and second ultrasound floating cones; and
    a controller coupled to the ultrasound sensor array for receiving the first trigger signal and for emitting an alarm signal indicative of the first trigger signal; the controller being configured to compute at least a first dimension of the body while it moves on said second path between the first and second ultrasound floating cones.

27. A system as recited in claim 23, wherein the at least one sensor assembly is movable relative to the intersection so as to modify the location of at least part of the detecting zone.

28. A system as recited in claim 23, wherein the at least one sensor assembly includes an ultrasound sensor configured for operation in pulse mode whereby a wide pulse is emitted towards the portion of the intersection.

29. A system for detecting a presence of a body at an intersection between first and second paths, the system comprising:
    an ultrasound sensor array for defining a detecting zone at the intersection of the first and second paths and for emitting a first trigger signal when the body is in the detecting zone; the sensor array including at least one sensor assembly that emits a first ultrasound floating cone towards a portion of the intersection; the first ultrasound floating cone defining at least part of the detecting zone; the first trigger signal being emitted when the body is at least partially in the first ultrasound floating cone; the ultrasound sensor is mounted to the movable portion of a pivotable gate positioned across the first path adjacent the second path on a first side thereof so as to emit the first ultrasound floating cone towards a portion of the second path; and
    a controller coupled to the ultrasound sensor array for receiving the first trigger signal and for emitting an alarm signal indicative of the first trigger signal.

30. A system for detecting a presence of a body at an intersection between first and second paths, the system comprising:
    an ultrasound sensor array for defining a detecting zone at the intersection of the first and second paths and for emitting a first trigger signal when the body is in the detecting zone; the sensor array including at least one sensor assembly having an ultrasound transducer and a concave dish operatively assembled together so that an ultrasound beam characterized by a width is produced when the ultrasound transducer emits a primary beam towards the concave dish; the at least one sensor assembly is oriented so as to emit the ultrasound beam towards the intersection; the ultrasound beam being part of the detecting zone; the width of the ultrasound beam is selected so that the system does not detect the body if the body has a maximum dimension less than the width of the ultrasound beam; and
    a controller coupled to the ultrasound sensor array for receiving the first trigger signal and for emitting an alarm signal indicative of the first trigger signal.

31. A system for detecting a presence of a body at the intersection between first and second paths, the system comprising:
    an ultrasound sensor array for defining a detecting zone at the intersection of the first and second paths and for emitting a first trigger signal when the body is in the detecting zone; the ultrasound sensor array including a first sensor assembly which creates a first series of acoustic lines which define a first detecting plane within the detecting zone; the first detecting plane defining a first angle with the first path; and
    a controller coupled to the ultrasound sensor array for receiving the first trigger signal and for emitting an alarm signal indicative of the first trigger signal; the controller further determining a first dimension of the body along a direction defined by the first detecting plane.

32. A system as recited in claim 31, wherein the ultrasound sensor array further includes a second sensor assembly which creates a second series of acoustic lines which define a second detecting plane within the detecting zone; the second detecting plane defining a second angle with the first path; the controller further determining a second dimension of the body along a direction defined by the second detecting plane.

33. A system for detecting a body at level crossings where a plurality of roads intersects a railway track, the system comprising: a plurality of detectors for detecting a presence of the body at the intersection between the roads and the railway track, each detector including an ultrasound sensor array for defining a detecting zone at an intersection of one the roads and the railway track and for emitting a first trigger signal when the body is in the detecting zone; and a junction control box having a unique junction address assigned thereto coupled to the ultrasound sensor array for receiving the first trigger signal and for emitting an alarm signal indicative of the first trigger signal.

34. A system for detecting a body at a level crossing where a road intersects a railway track, the system comprising:

a system as recited in claim 1 wherein the road defines the first path and the railway track defines the second path.

35. A system as recited in claim 34, wherein the controller is a junction control box.

36. A system as recited in claim 35, further comprising at least one controllable stop display coupled to the junction control box for receiving therefrom at least one of the first trigger signal and the alarm signal and for displaying visual information accordingly.

37. A system as recited in claim 35, wherein the junction control box is configured for communication with a remote controller located on a train or in a monitoring center.

38. A system as recited in claim 37, wherein the junction control box includes a wireless device for communication with a compatible wireless device connected to the remote controller for sending at least one of the alarm signal and the trigger signal.

39. A system for detecting a body at a level crossing where a road intersects a railway track, the system comprising:

an ultrasound sensor array for defining a detecting zone at the intersection of the road and the railway track and for emitting a first trigger signal when the body is in the detecting zone; and a junction control box coupled to the ultrasound sensor array for receiving the first trigger signal and for emitting an alarm signal indicative of the first trigger signal; the junction control box being configured for communication with a remote controller located on a train or in a monitoring center; at least one of the junction box and the at least one remote controller including means for calculating the probability of impact between the at least one train and a detected body at the intersection using a speed of the at least one train and a distance of the at least one train relatively to the ultrasound sensor array.

40. A system as recited in claim 39, wherein the means for calculating the probability of impact includes information indicative of weather conditions.

41. A system as recited in claim 39, wherein the distance of the at least one train is determined using a Global Positioning System.

42. A system for detecting a body at a level crossing where a road intersects a railway track, the system comprising:

an ultrasound sensor array for defining a detecting zone at the intersection of the road and railway track and for emitting a first trigger signal when the body is in the detecting zone; and a controller coupled to the ultrasound sensor array for receiving the first trigger signal and for emitting an alarm signal indicative of the first trigger signal; the level crossing including at least two pivotable gates which intersect the road on opposite sides of the railway track; the ultrasound sensor array including at least one ultrasound sensor mounted to at least one of the two pivotable gates.

43. A system as recited in claim 42, wherein the at least one ultrasound sensor produces at least one of detecting acoustic lines and at least one floating cone between the at least two pivotable gates.

* * * * *